July 28, 1959  M. J. LIESER  2,896,664
NORMALLY OPEN THREE-WAY VALVE
Filed Aug. 17, 1955
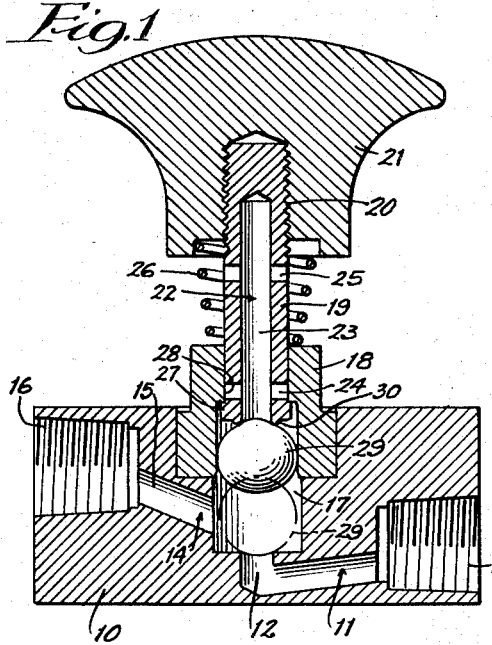
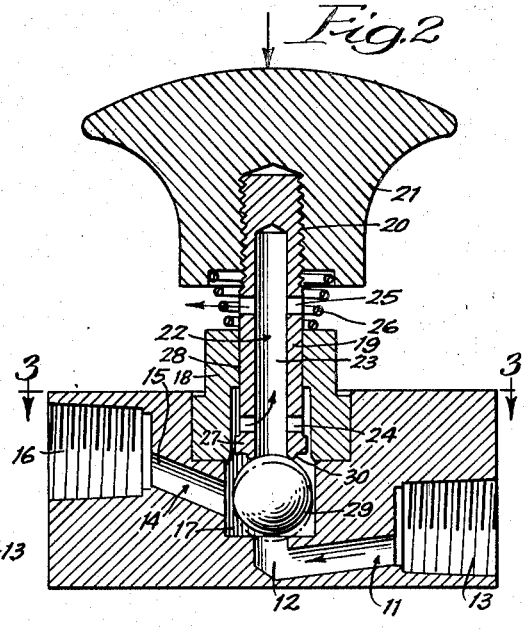
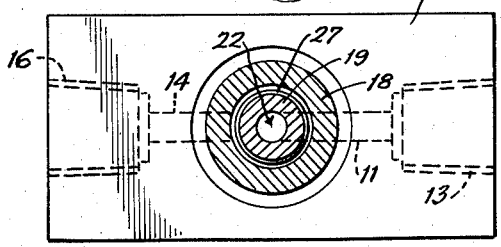
INVENTOR:
Mathias J. Lieser,
BY
Dawson, Tilton & Graham,
ATTORNEYS.

United States Patent Office

2,896,664
Patented July 28, 1959

2,896,664

NORMALLY OPEN THREE-WAY VALVE

Mathias J. Lieser, Chicago, Ill., assignor to Mead Specialties Company, Inc., Chicago, Ill., a corporation of Illinois Application August 17, 1955, Serial No. 528,958

5 Claims. (Cl. 137—620)

This invention relates to a valve structure, and more particularly to a three-way valve that in released position is open permitting the flow of pressure fluid therethrough.

An object of this invention is to provide an improved three-way valve structure. Another object of the invention is in providing a valve structure that functions to pass pressure fluid to an outlet port, to selectively interrupt such flow and to exhaust the outlet port, the valve offering material, labor and cost savings but providing effective, efficient and reliable operation.

A further object of this invention is to provide a three-way valve structure employing a ball as the valve element, a single ball being operative to selectively seal off the pressure fluid inlet port or the exhaust port or outlet. Yet a further object is in providing a valve structure of the character described having a valve chamber communicating at one end with an inlet port for pressure fluid and at its other end with a discharge port, the ball valve being mounted for movement within the chamber from end to end thereof and being slightly compressible so that it is flattened by the pressure fluid exerted thereagainst, and when its movement within the chamber is impeded, to flatten and sealingly engage the walls of the valve chamber. Additional objects and advantages will become apparent as the specification develops.

An embodiment of the invention is illustrated in the accompanying drawing, in which—

Figure 1 is a longitudinal sectional view through a valve structure embodying the invention, and showing the valve in its normally open position; Figure 2 is a longitudinal sectional view similar to that of Figure 1, but showing the valve after being partially moved toward closed position; and Figure 3 is a longitudinal sectional view taken along the line 3—3 of Figure 1.

The valve illustrated in the drawing, and the subject of this invention, is a three-way valve as contrasted with a simple on/off valve. The valve structure provides three functions. First, when in open position, it permits the free flow of pressure fluid between its inlet and outlet ports. Secondly, when in closed position, it seals off the inlet port. And thirdly, while sealing off the inlet port, it exhausts pressure fluid from the inlet port. The valve is useful as a control device for controlling the operation of machinery and equipment generally that is operated by pressure fluid. The valve may either be operated by hand or it may be associated with cams or levers or other actuating arrangements for shifting the control member of the valve between open and closed positions.

The valve has a casing or chest 10 provided with a pressure fluid inlet port designated generally with the numeral 11, and that comprises an inlet passage 12 having a threaded end 13 adapted to receive the fitting of a pressure fluid conduit therein. The casing 10 also provides a discharge or outlet port designated generally with the numeral 14, and that includes an outlet flow passage 15 having an enlarged threaded end 16 adapted to receive the threaded fitting of a pressure fluid conduit. The port 11 communicates through the bottom wall thereof with a valve chamber 17, and the outlet port 14 communicates with the same chamber through a side wall thereof and adjacent its bottom end. Preferably, the chamber 17 is cylindrical in cross section.

The chamber 17 at its upper end is enlarged and receives therein a bearing or bushing 18. Preferably, a press fit is provided to lock the bearing member in the position shown in the casing 10. The bearing member 18 has a slide passage extending therethrough, and slidably mounted within that passage is a stem 19 that at its upper end may be threaded, as shown at 20, to threadedly receive thereon a button or head 21. It should be appreciated that the button 21 is provided when the valve structure is intended for hand operation, but may be readily removed to equip the end of the stem with a cam follower or similar arrangement where the valve is actuated by mechanical mechanisms.

The stem 19 is provided with an exhaust port designated generally with the numeral 22, and that comprises a longitudinally extending exhaust passage section 23 opening into the chamber 17 and communicating adjacent that end of the stem with a transverse exhaust passage 24, and adjacent its upper end with a transversely extending exhaust passage 25. The stem 19 is normally biased to the open position of the valve, or expanded position of the valve stem by a coil spring 26. The stem is prevented from being shifted completely out of the bearing member 18 by abutting engagement between the annular shoulder 27 carried by the stem and complementary annular shoulder 28 provided by the bearing member along the slide passage therethrough.

Mounted within the chamber 17 is a compressible valve 29 that is preferably a ball valve and may be formed of rubber or any other material that will provide some degree of compressibility under the forces exerted thereagainst as a result of the fluid pressures present in the valve structure and acting thereagainst. For example, a rubber ball having an elasticity rating of from 40 to 45 Durometer has been found satisfactory. The ball is dimensioned so that it is movable longitudinally through the chamber 17 between the lower end thereof at the inlet port 11 (as shown by dotted lines) and the upper position thereof (shown by full lines in Figure 1), wherein it abuts the lower end of the stem 19. It will be apparent that the inlet port is disposed along the path of movement of the stem 19 within the valve chamber, and lies in a plane substantially normal to the longitudinal axis of the stem.

In operation of the valve, it will be connected into a pressure fluid line so that pressure fluid will be delivered to the inlet port 11, and the pressure fluid will be carried through the outlet port 14 through some device actuated by the fluid under pressure. Before pressure is present at the inlet port 11, the valve 29 will be in the lowermost position shown by dotted lines in Figure 1, and the valve stem 19 will be in open or expanded position, as shown also in Figure 1. Immediately upon the presence of fluid pressure at the inlet port 11, the valve 29 will be forced upwardly in the chamber 17 and against the lower end of the stem 19 which may have a depending lip 30 thereon (as shown) to provide a valve seat. Open communication will thereby be established between the ports 11 and 14 through the chamber 17.

As has been brought out, the valve 29 is compressible, and under the pressures present in the system (the valve will ordinarily accommodate a pressure range of from about 15 to 125 p.s.i.) will be flattened slightly in one direction when its movement within the chamber 17 is impeded—or more specifically, when it abuts the depending lip 30 of the valve stem. In being flattened, the transverse dimension thereof increases and the ball valve sealingly engages the walls of the chamber 17. It will be appreciated that the chamber 17 includes both that portion of the chamber defined by the casing 10 and that portion defined within the bearing member 18. Since the ball valve forms a seal with the walls of the chamber, none of the pressure fluid flowing into the chamber from the inlet passage can escape through the exhaust passage 22 of the stem.

To close the valve, the button 21 thereof is depressed to shift the stem 19 inwardly or toward closed position. Such movement of the stem will move the ball 29 downwardly within the chamber 17 and ultimately into engagement with the lower end of the chamber to establish a fluid-tight seal about the inlet port 11. At such time, the outlet passage 14 will be exhausted to atmosphere since it is in open communication with the transverse passage 24, longitudinal passage 23 and upper transverse passage 25 that opens to atmosphere.

During the movement of the stem to retracted position, or toward the closed position of the valve, both the inlet port 11 and outlet port 14 will communicate with the exhaust passages, but since the loss of time in moving the valve from full open to full closed positions is minimal, the loss of pressure fluid from the inlet port is insignificant.

The valve always returns the outlet port 14 to atmospheric pressure whenever the presence of a pressure fluid at the port 11 is removed. That is, assuming the valve to be in the full on position shown in Figure 1, and an interruption in the flow of pressure fluid in that port occurs, the compressible valve 29 will restore itself to its original spherical dimensions and the valve will drop into the lowermost position shown by dotted lines in Figure 1. Since the longitudinally extending passage 23 communicates with the chamber 17 through the lower end of the stem, that passage will then be in open communication with the outlet port 14, and that port will be exhausted to atmosphere.

The valve structure is exceedingly simple in construction and requires the use of no packing or sealing glands, whereby a relatively loose tolerance may be provided between the stem 19 and walls of the bearing member 18. This, of course, further reduces the manufacturing costs. The single compressible ball valve 29 performs all of the sealing functions required in the valve; and in addition to selectively closing the inlet port or the exhaust port, also performs the usual function of sealing glands which are customarily required about moving valve elements such as the stem 19.

While in the foregoing specification an embodiment of the invention has been set forth in considerable detail for purposes of adequately describing the invention, it will be apparent to those skilled in the art that numerous changes may be made in those details without departing from the spirit and principles of the invention.

I claim:

1. In a three-way valve structure having a casing provided with an inlet port for pressure fluid, an outlet port, and a valve member in open communication with said ports, a stem having an exhaust passage therein and being longitudinally movable through said chamber between a position wherein said stem extends into said chamber and a position wherein said stem is retracted from said chamber, but being normally biased toward the position wherein said stem is retracted from said chamber, said inlet port being disposed at an end of said chamber in the path of movement of said stem, and a resilient ball valve freely mounted within said chamber and being shiftable therein along the path of movement of said stem, said valve, when said stem is in retracted position, being urged into engagement with said stem by the admission of pressure fluid through said inlet port and being compressed thereby along one dimension and expanded along another dimension into sealing engagement with the walls of said chamber to seal an exhaust passage of said stem, said valve, when said stem is in the extended position, being shifted correspondingly to seal said inlet port.

2. In a three-way valve, a casing providing a valve chamber therein, said casing providing an inlet port communicating with said chamber and an outlet port also communicating with said chamber, a resilient, compressible valve freely mounted within said chamber, a valve stem carried for slidable movement within said chamber between open and closed positions, said valve stem being provided with an exhaust passage, and means biasing said stem toward open position, said ball valve being dimensioned so as to flatten into sealing engagement with the walls of said chamber under the influence of the pressure fluid exerted thereagainst when movement of the valve within said chamber is interrupted by engagement with said stem, thereby sealing said exhaust passage, and when said stem is shifted to closed position, said stem compressing said valve to seal said inlet port.

3. The structure of claim 2, in which said inlet port lies in a plane substantially normal to the longitudinal axis of said stem.

4. The structure of claim 3, in which said outlet port is disposed laterally of said inlet port and so positioned as to remain open continuously during movement of said stem over its entire range of movement.

5. In a three-way valve, a casing providing a valve chamber therein, a compressible resilient ball valve freely mounted within said chamber, said casing providing an inlet port communicating with said chamber adjacent the lower end thereof, a valve stem loosely mounted in said casing opposite said inlet port and shiftable longitudinally through said chamber toward and away from said inlet port, said stem having an exhaust passage therein and being biased away from said inlet port, said casing being provided with an outlet port communicating with said chamber intermediate the ends thereof, and said valve being dimensioned so as to flatten in a direction along the path of movement of said stem when in embedding relation with said stem and pressure fluid from said inlet port is acting thereagainst to expand along a plane substantially normal to the path of movement of said stem into sealing engagement with the walls of said chamber; and said valve, when such stem is shifted toward said inlet port, being compressed so as to seal said inlet port.

References Cited in the file of this patent

UNITED STATES PATENTS

| 1,959,336 | Bast | May 22, 1934 |
| 2,426,941 | Mercier | Sept. 2, 1947 |
| 2,545,000 | Martin | Mar. 13, 1951 |
| 2,555,907 | Venard | June 5, 1951 |
| 2,664,266 | Johnson | Dec. 29, 1953 |
| 2,724,555 | Roetter | Nov. 22, 1955 |